(12) United States Patent
Kroesser, III et al.

(10) Patent No.: US 7,172,704 B1
(45) Date of Patent: Feb. 6, 2007

(54) METHOD FOR TREATING WASTE WATER

(75) Inventors: John L. Kroesser, III, Fort Lauderdale, FL (US); Paul Craig Mellinger, Fort Lauderdale, FL (US); Mark Wayne Mellinger, Pompano Beach, FL (US); Lynn Wallace, Fort Lauderdale, FL (US); Art Smith, Fort Lauderdale, FL (US); Randy Lego, Fort Lauderdale, FL (US); Melvyn Wayne Mellinger, Fort Lauderdale, FL (US); Scott Hudson, Jensen Beach, FL (US)

(73) Assignee: Headhunter, Inc., Fort Lauderdale, FL (US)

( * ) Notice: Subject to any disclaimer, the term of this patent is extended or adjusted under 35 U.S.C. 154(b) by 245 days.

(21) Appl. No.: 10/888,316

(22) Filed: Jul. 9, 2004

Related U.S. Application Data

(60) Provisional application No. 60/485,983, filed on Jul. 10, 2003.

(51) Int. Cl.
*C02F 1/72* (2006.01)
(52) U.S. Cl. .................... 210/744; 210/754; 210/756; 210/757; 210/759; 210/760; 210/769; 210/805

(58) Field of Classification Search ................ 210/741, 210/744, 754, 756, 758–760, 769, 805
See application file for complete search history.

(56) References Cited

U.S. PATENT DOCUMENTS

| 3,401,115 | A | * | 9/1968 | Meyer et al. ............... 210/756 |
| 3,480,543 | A | * | 11/1969 | Hildebrand ................. 210/754 |
| 5,837,142 | A | * | 11/1998 | Mullerheim et al. ........ 210/650 |

* cited by examiner

*Primary Examiner*—Matthew O. Savage
(74) *Attorney, Agent, or Firm*—Buskop Law Group PC; Wendy Buskop

(57) ABSTRACT

A method for treating waste water fluid, wherein the method comprises the steps of macerating waste water fluid in a first tank forming a sheared fluid, filtering the sheared fluid to remove solids, forming unfiltered waste water and product water, flowing product water to the first tank when the waste water fluid level is below the product water manifold, flowing the product water to a second tank when the waste water fluid level covers the product water manifold, flowing product water in the second tank into a vented loop to a third tank, diluting fluid in the third tank with raw water from a raw water source forming de-chlorinated water; and removing the de-chlorinated water from the third tank.

12 Claims, 5 Drawing Sheets

METHOD FOR TREATING WASTE WATER

The present application claims priority to U.S. Provisional Patent Application 60/485,983 filed on Jul. 10, 2003.

FIELD

The present embodiments relate to methods for treating waste water fluid and processing liquid and solid waste streams particularly for boats, other floating vessels and recreational vehicles.

BACKGROUND

Waste disposal has long been a problem for owners of boats, recreational vehicles, and other transportation vehicles. In most places, the indiscriminate dumping of raw or untreated waste material is prohibited by environmental regulations. Accordingly, a variety of different waste disposal systems have been previously proposed.

Generally, waste disposal systems employ a treatment tank into which the waste material from a water closet or head is placed. Chemicals are added to the treatment tank and allowed to interact with the waste material for a sufficient time to kill the bacteria. Many of these systems employ macerators to chop or break up the waste material into small particles and to mix the waste material with a chemical solution in the tank to enhance chemical action. After a sufficient period of time for the bacteria to be killed or reduced to an acceptable level, the contents of the tank are discharged into the environment.

Single tank chemical systems have a number of disadvantages. The chemicals, which they employ, are expensive and produce a strong unpleasant odor. Moreover, chemical systems are not always totally effective in killing bacteria; therefore, the discharged waste material may still cause pollution and environmental problems.

A need exists for a sanitation system which uses fewer chemicals and has improved reliability and serviceability. The embodied method provides a mechanically manageable wastewater fluid treatment method with virtually no human exposure to potentially harmful oxidation materials.

SUMMARY

This is a method for treating waste water fluid by first macerating waste water fluid from a first tank to form a sheared fluid and filtering the sheared fluid into two streams, an unfiltered waste water and a product water stream. The product water stream, which is either flowed into the first tank or into the second tank depending on the level of waste water fluid in the first tank. The product water is then flowed into a product water manifold. If the amount of waste water fluid in the first tank is above the product water manifold, the product water is directed to the second tank if the amount of waste water fluid in the first tank is below the product water manifold, the product water is directed back to the first tank. From the second tank, product water is directed through a macerating water jet to a vented loop. The macerating water jet on demand, can macerate the product stream before the stream enters the third tank. The product stream in the third tank is de-chlorinated by diluting the product water with raw water. The de-chlorinated water is then removed from the third tank.

BRIEF DESCRIPTION OF THE DRAWINGS

The present embodiments will be described further with reference to the appended drawings, in which.

The present embodiments are detailed below with reference to the listed Figures.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention provides a method for treating waste fluid which does not require the dumping of waste water. Instead of flushing waste water to the environment or having to make frequent inconvenient trips to a waste water disposal location, the methods is designed to treat and manage sewage wastewater aboard commercial and personal watercraft for extended periods of time.

The method involves, first macerating the waste water fluid in a first tank forming a sheared fluid. This sheared fluid is then filtered through a cross flow filter forming unfiltered waste water and product water. The unfiltered waste water is returned to the first tank. The product water is flowed to a water manifold. Product water is flowed through a product water manifold outlet to a second tank when the waste water fluid level covers a first product water manifold outlet. Product water flows to the first tank when waste water fluid is below the product water manifold. The Product water flows into a vented loop though a macerating water jet to a third tank and is de-chlorinated in the third tank by diluting the fluid with raw water from a raw water source.

Figure 1:
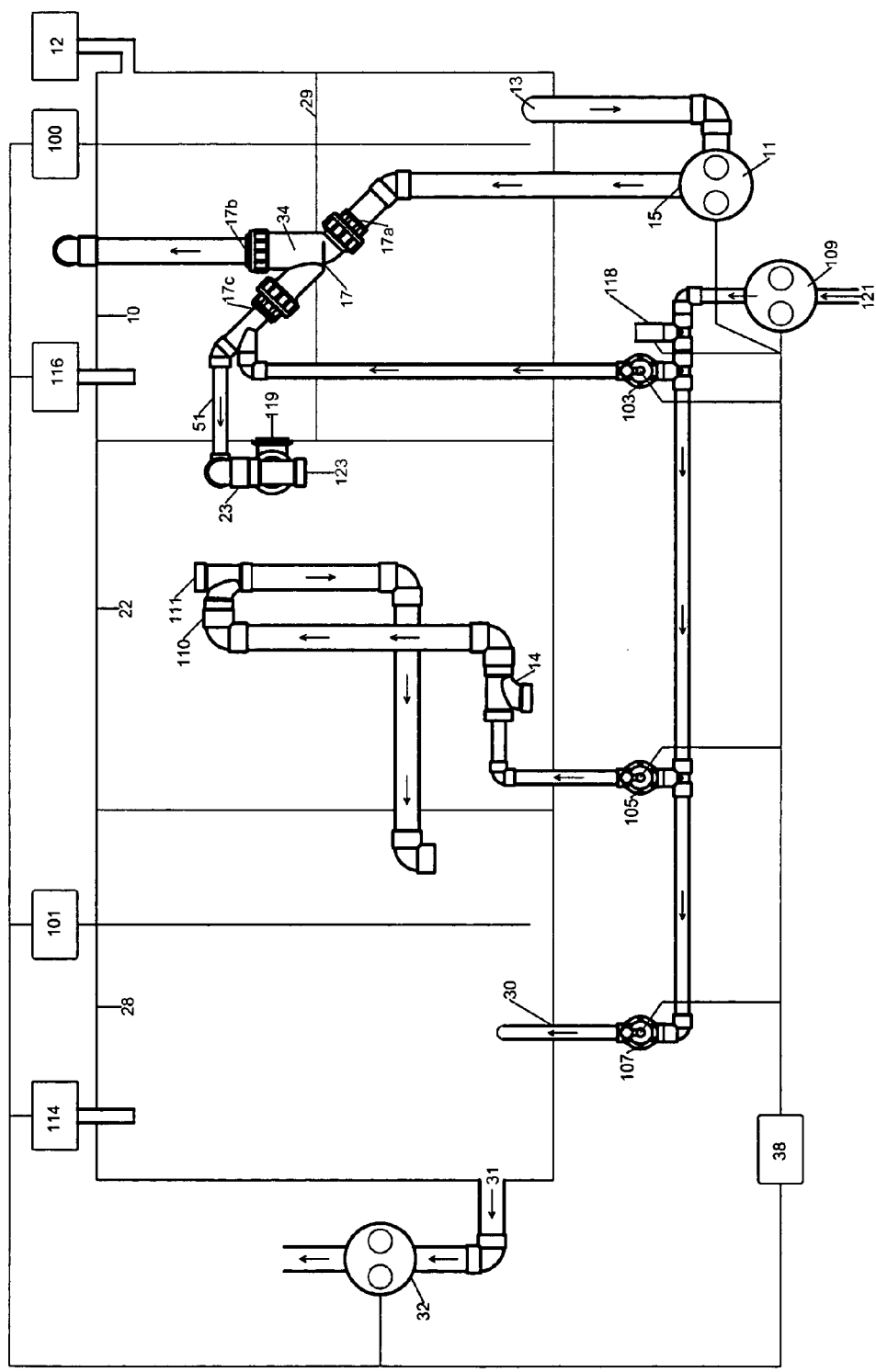
FIG. 1 depicts a side schematic view of an embodiment of equipment usable in this method.

With reference to the figure, FIG. 1 the method uses a sanitation system utilizing three tanks: a first tank 10, a second tank 22, and a third tank 28.

The first tank 10 receives waste water fluid 29 through inlet 12 and then discharges the waste water fluid 29 through an outlet 13 to a maceration pump 11. The maceration pump 11 operates continuously. The maceration pump 11 shears solids in the waste water fluid and directs the sheared fluid 15 to a cross flow filter 17.

Figure 2:
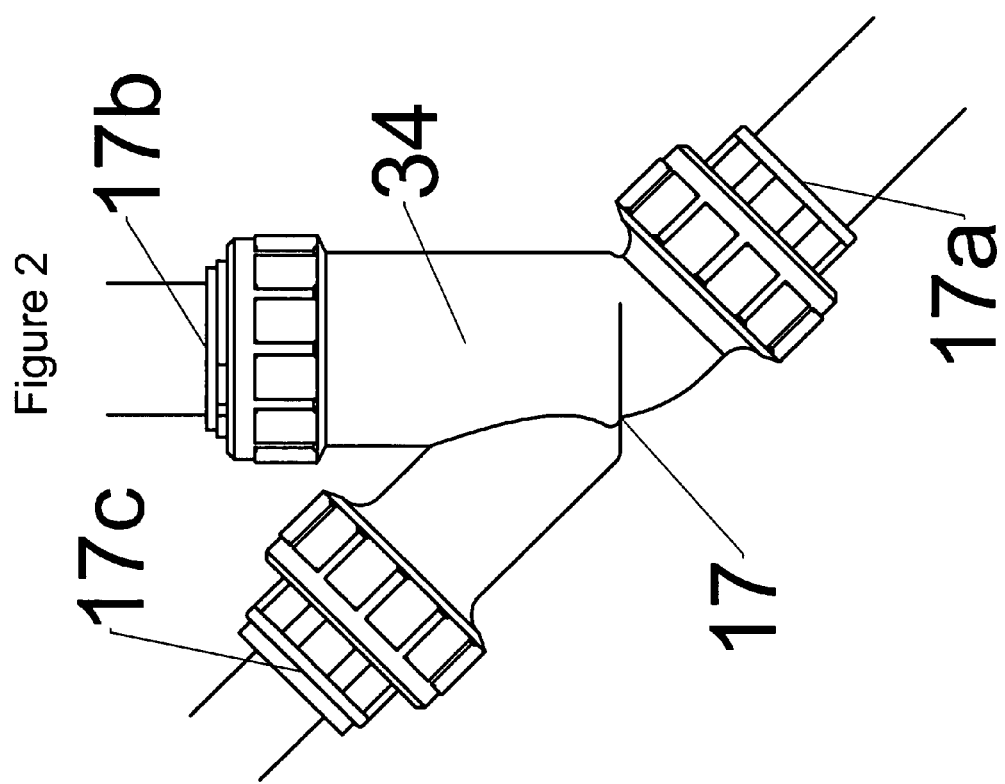
FIG. 2 depicts a detailed view of the cross filter usable with this method.
Figure 3:
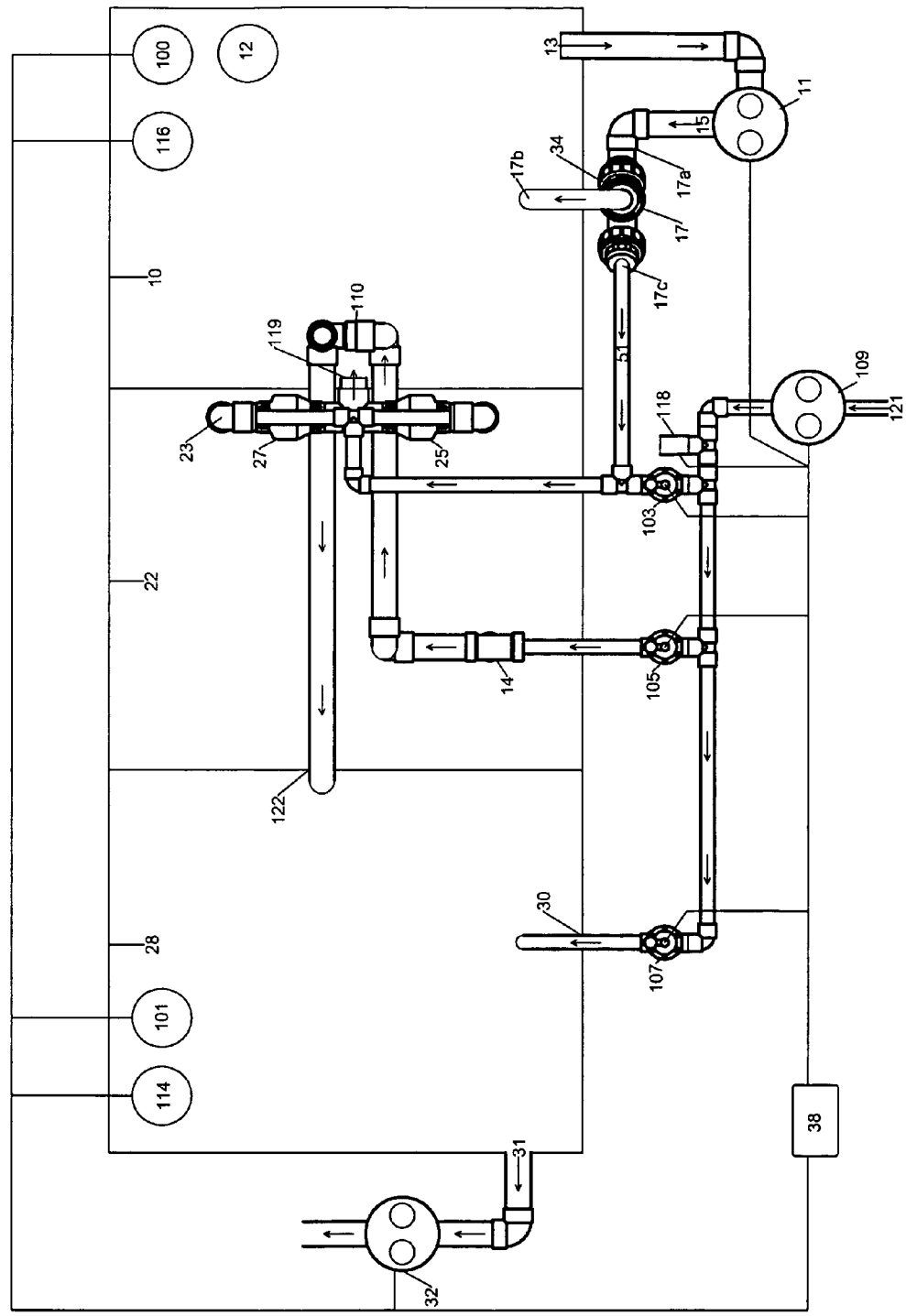
FIG. 3 depicts a top view of another embodiment of the equipment usable in the method of the invention.

The sheared fluid 15 from the maceration pump 11 is directed across a cross flow filter 17. FIG. 2 depicts the cross flow filter 17 in more detail. As shown in FIG. 2 the cross flow filter 17 has a first segment 17a that receives the sheared fluid 15 from the maceration pump 11. The sheared fluid 15 flows across media 34. Some of the sheared fluid 15 travels up the center of the media 34 to become product water 51. The product water 51 flows through a second segment 17c and out of the first tank to a product water manifold 23. Additional fluid, such as raw water, flows across the media 34 from a raw water pump 109 connected to a raw water source 121 to keep the media 34 clear of particulate matter. This raw water fluid flow is back flushing of the solids from the media to keep the cross flow filter 17 clean. The fluid flow continuously washes the media 34 then flows fluid into the third segment 17b and back into the first tank 10 as unfiltered waste water. It should be noted that FIG. 1 shows an embodiment wherein the cross flow filter 17 is located within first tank 10 and FIG. 3 shows a different embodiment with the cross flow filter 17 outside of first tank 10.

Returning to FIG. 1, raw water is provided by the raw water pump 109 which pulls water from raw water source 121 to components affiliated with each tank. The raw water is used in association with the first tank to flush the cross flow filter 17 and provide unfiltered waste water to the first tank. Product water 51 from cross flow filter 17 flows to the product water manifold 23. The product water manifold 23 can have one or more one-way valves, which preferably are check valves. One one-way valve is shown as element 25, which directs product water 51 into either the first tank 10 or the second tank 22. The embodiment depicted in FIG. 3 shows two one-way valves 25 and 27 used for the two outlets, shown for the product water manifold.

The product water manifold 23 is located in the second tank 22 at a specified height. The product water manifold 23 preferably has a first product water manifold outlet 119, and a second product water manifold outlet 123. If the waste water fluid 29 in the first tank is below the first product water manifold outlet 119, the water from the cross flow filter 17 flows back into the first tank 10. If the waste water fluid 29 level in the first tank 10 is above the first product water manifold outlet 119, the product water 51 from the cross flow filter 17 flows into the second tank 22 through the respective outlets as shown.

Raw water can be moved from the raw water source 121 by the raw water pump 109 to a second solenoid valve 105. The second solenoid controls raw water to facilitate pushing the product water 51 to and through a macerating water jet 14 located in the second tank 22. The macerating water jet 14, can be used to create a Venturi effect and pull product water 51 from the second tank 22 through the macerating water jet 14 and into a vented loop 110. The macerating water jet 14 may or may not be operating as a maceration device during this fluid flow. The vented loop 110 preferably has a vented loop opening 111 at the top of the vented loop 110 to create a suction effect to pull product water 51 through the vented loop 110, and into the third tank 28.

Raw water from the raw water pump 109 also flows to a third solenoid valve 107 used to control raw water flow into the third tank 28 through third tank inlet 30. Product water 51 from the vented loop 110 through the vented loop outlet 122 is de-chlorinated. The de-chlorinated water 59 is pulled out of the third tank 28 by gravity or by a discharge pump 32. A de-chlorinator 114 can be used to facilitate de-chlorination of water in the third tank.

An oxidizer 116 may be used with first tank 10 to add oxidizer to the waste water fluid 29 in the first tank 10.

Types of oxidizers usable in these sanitation systems include chlorine, bromine, ozone, hydrogen peroxide, combinations thereof, and other compounds that have similar oxidizing properties. Other oxidizers for use with these sanitation systems include trichloroisocyanuric acid, calcium hypochlorite, and sodium hypochlorite.

The cross flow filter 17 contains a disposable membrane as the media 34. Examples of usable disposable membranes include polypropylene membrane, a polyethylene membrane, and a polyamide membrane with Nylon™. The polyamide membrane is the preferred material and is available from the Dupont Company of Wilmington, Del. The membranes can be mesh. The media can be a plurality of monofilament fibers or a non-woven polymer which can be preferably extruded. The disposable membranes usable herein preferably have a pore sizes that range from about 100 microns to about 2000 microns, with a 1200 micron pore size being a preferred pore size.

Figure 4:
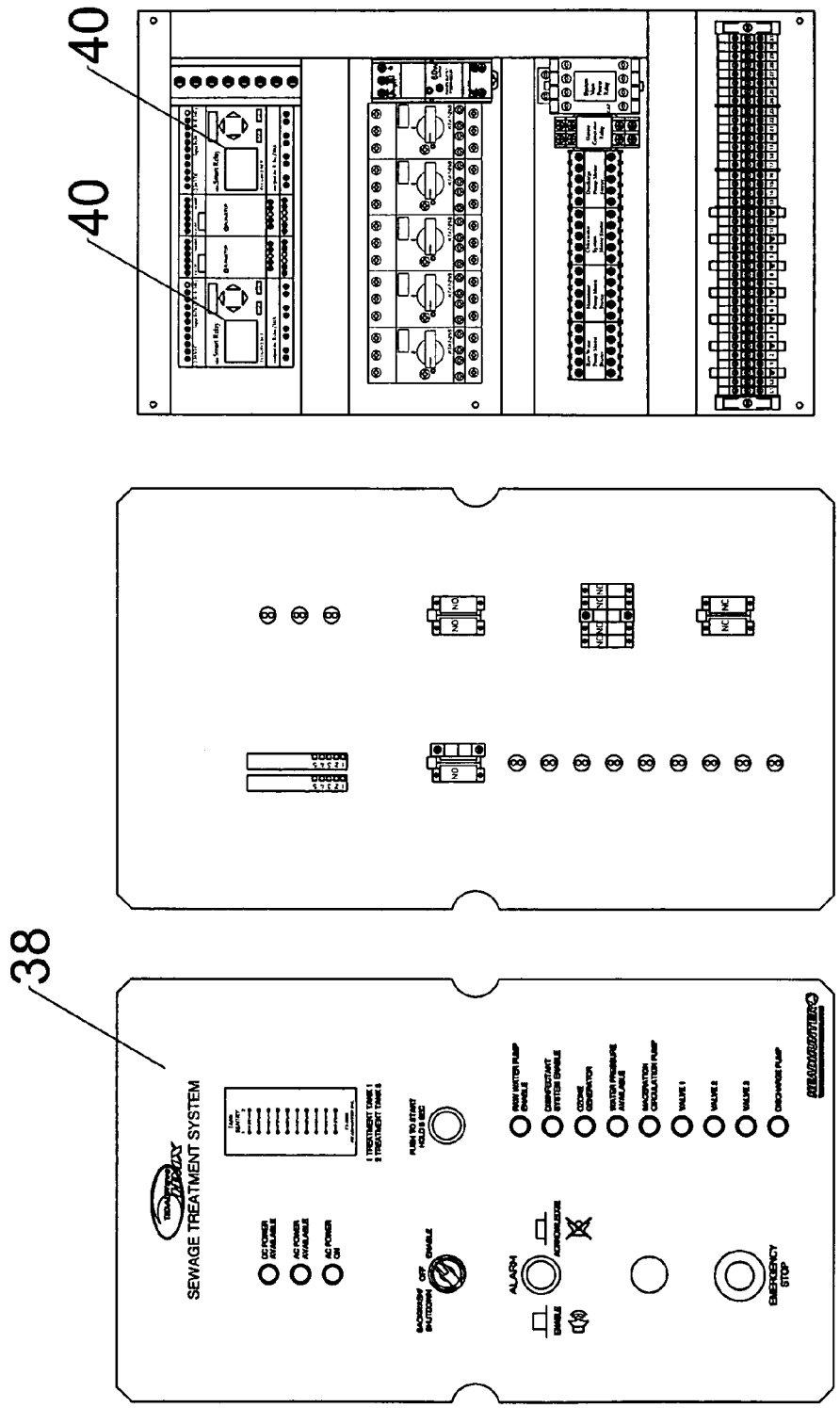
FIG. 4 depicts a control panel usable in the method of the invention.

The method controls the flow of water, typically using a control panel 38 connected to the various devices of the system. In FIG. 1, FIG. 3 and FIG. 4 control panel 38 has microprocessor 40 connected to discharge pump 32. The control panel 38 can activate and deactivate the discharge pump 32. The control panel 38 can open and close macerating water jet 14. The control panel 38 can be used to control a pressure switch 118 located between the raw water pump 109 and the tanks. The control panel can also control the maceration pump 11 and the m solenoid valves 103, 105, and 107.

In an alternative embodiment, the sanitation method can have the step of monitoring fluid levels in the tanks and comparing those levels to preset limits to operate or turn off pumps, valves and jets. FIG. 1 shows a first monitor 100 in first tank 10 to monitor the level of waste water fluid 29. A second monitor 101 is shown in the third tank 28 to detect the level of de-chlorinated water 59. The monitor or monitors are preferably in communication with the microprocessor 40 of the control panel 38 which is adapted to activate and deactivate the various equipment based on comparisons of the fluid levels to preset limits stored in the microprocessor 40.

It should be noted that the waste water fluid 29 can be macerated and oxidized simultaneously with this system.

Figure 5:
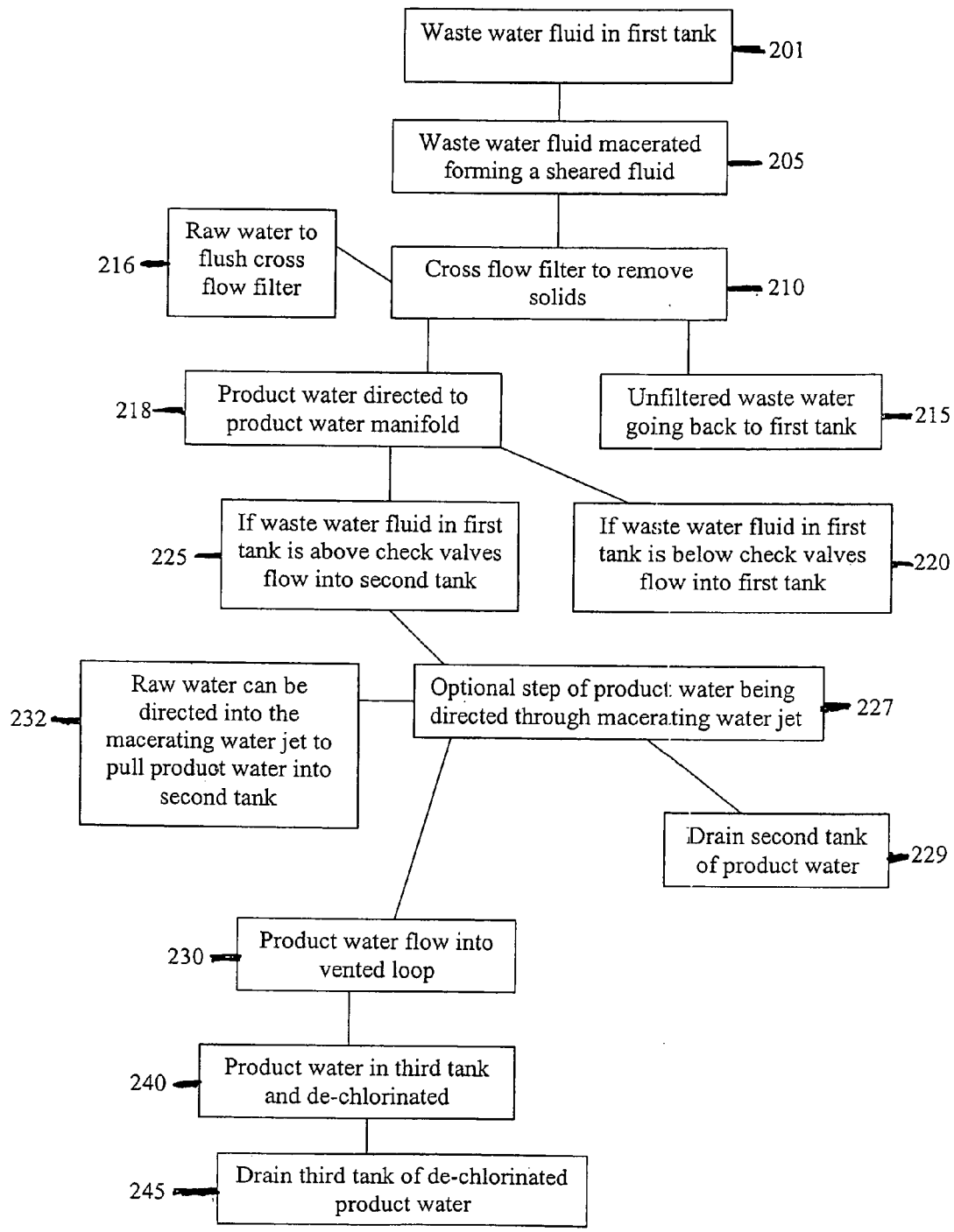
FIG. 5 is a flow diagram of an embodiment of a method for treating waste water fluid.

FIG. 5 is a schematic of an embodiment of a method for treating waste water fluid.

Waste water fluid from the first tank (Step 201) is macerated forming a sheared fluid (Step 205). Waste water fluid can be a liquid waste stream or a stream containing a mixture of liquid and solid wastes. Typically, between about 10 gallons to about 50,000 gallons per day of waste water can be treated using the embodied method.

The sheared fluid is passed across a filter, preferably a cross flow filter to remove solids (Step 210) and form a stream of product water and a stream of unfiltered waste water. After crossing the cross flow filter the unfiltered waste water is returned to the first tank (Step 215) and the product water is flowed to the product water manifold (Step 218). Raw water can be used to flush the cross flow filter periodically (Step 216).

If the waste water fluid level in the first tank is below the product water manifold, the product water is directed to the first tank (Step 220). If the waste water fluid level in the first tank is above the product water manifold, the product water is directed to the second tank (Step 225).

Once the product water is in the second tank, the product water flows into a vented loop, which allows the product water to flow into a third tank (Step 230). The product water can be directed through a macerating water jet prior to entering the vented loop (Step 227). The macerating water jet preferably, macerates the product water prior to flowing into the vented loop. The second tank optionally can be drained using the macerating water jet to pull product water from the second tank (Step 229). Raw water can be directed through the macerating water jet in order to facilitate pulling product water into the macerating water jet from the second tank (Step 232).

In the third tank, the product water is de-chlorinated by diluting the product water with raw water (Step 240). In an alternative embodiment, the product water can be additionally de-chlorinated by adding sodium thiosulfate water in an amount ranging from about 1 pound to about 25 pounds to the de-chlorinated water.

Optionally, waste water fluid can be oxidized in the first tank by adding an oxidizing compound to the waste water fluid in the first tank prior to macerating the waste water fluid.

The method ends by removing the de-chlorinated water from the third tank (Step 245). The de-chlorinated water can be removed using a discharge pump or by gravity flow.

In an alternative embodiment, the method can utilize a pressure switch to control raw water flow into the tanks. The method can utilize a control panel connected to the various devices to control raw water flow into to the tanks and to optimize operation of the method.

While these embodiments have been described with emphasis on the preferred embodiments, it should be understood that within the scope of the appended claims, these embodiments might be practiced and carried out in various ways other than as specifically described herein.

What is claimed is:

1. A method for treating waste water fluid, wherein the method comprises the steps of:
   a. macerating waste water fluid in a first tank forming a sheared fluid;
   b. filtering the sheared fluid to remove solids by separating the waste water into two streams forming unfiltered waste water and product water using a cross-flow filter;
   c. returning the unfiltered waste water to the first tank;
   d. flowing product water to the first tank when the waste water fluid level is below a product water manifold;
   e. flowing the product water to a second tank when the waste water fluid level covers the product water manifold;
   f. flowing product water in the second tank into a vented loop to a third tank, and upon demand, draining the second tank of product water, and upon demand, macerating the product water of the second tank prior to flowing the product water into the vented loop;
   g. adding a de-chlorinating agent to the third tank and diluting fluid in the third tank with raw water from a raw water source forming de-chlorinated water; and
   h. removing the de-chlorinated water from the third tank.

2. The method of claim 1, wherein the step of removing the de-chlorinated water is carried out using a discharge pump.

3. The method of claim 1, wherein the de-chlorinating agent is sodium thiosulfate.

4. The method of claim 1, further comprising the step of adding an oxidizing compound into the waste water fluid in the first tank prior to macerating the waste water fluid.

5. The method of claim 4, wherein the oxidizing compound is selected from the group consisting of trichloroisocyanuric acid, calcium hypochlorite, sodium hypochlorite, chlorine, bromine, ozone, a hydrogen peroxide oxidizing composition, and combinations thereof.

6. The method of claim 1, further comprising the step of using a control panel connected to a macerating pump to carry out the step of macerating waste water fluid.

7. The method of claim 1, further comprising the step of monitoring the level of the waste water fluid in the first tank and the level of de-chlorinated water in the third tank and communicating those fluid levels to a control panel.

8. The method of claim 1, wherein the step of macerating the waste water fluid is performed at a rate ranging from about 10 gallons to about 50,000 gallons per day.

9. The method of claim 1, wherein the step of filtering is performed with a disposable filter.

10. The method of claim 9, wherein the disposable be filter has a pore size ranging from about 100 microns to about 2000 microns.

11. The method of claim 1, wherein the waste water fluid is a liquid waste stream or a mixture of liquid and solid wastes.

12. The method of claim 1, further comprising the step of using pumped raw water to pull product water into the vented loop.

* * * * *